United States Patent [19]
Mori

[11] Patent Number: 5,829,331
[45] Date of Patent: Nov. 3, 1998

[54] TOOL HOLDER AND CUTTING PROCESS USING THE TOOL HOLDER

[75] Inventor: Takaaki Mori, Okazaki, Japan

[73] Assignee: Nippondenso Co., Ltd., Japan

[21] Appl. No.: 715,621

[22] Filed: Sep. 18, 1996

[30] Foreign Application Priority Data

Sep. 18, 1995 [JP] Japan ................................... 7-238561
Jul. 1, 1996 [JP] Japan ................................... 8-171516

[51] Int. Cl.⁶ .................................................. B23B 27/22
[52] U.S. Cl. .................................... 82/158; 407/5; 407/11
[58] Field of Search .......................... 82/1.11, 158, 901; 407/2, 5, 6, 11, 100, 102

[56] References Cited

U.S. PATENT DOCUMENTS

| | | | |
|---|---|---|---|
| 2,854,735 | 10/1958 | Dukes | 407/5 |
| 4,228,705 | 10/1980 | Heisner | 82/158 |
| 4,664,567 | 5/1987 | Edwards | 407/11 X |
| 4,955,264 | 9/1990 | Armbrust | 82/158 |
| 5,340,242 | 8/1994 | Armbrust et al. | 407/11 |

FOREIGN PATENT DOCUMENTS

| | | | |
|---|---|---|---|
| 2854299 | 7/1979 | Germany | 407/100 |
| 2-015805 | 1/1990 | Japan . | |
| 3-170204 | 7/1991 | Japan . | |

*Primary Examiner*—A. L. Pitts
*Assistant Examiner*—Henry W. H. Tsai
*Attorney, Agent, or Firm*—Cushman Darby & Cushman IP Group of Pillsbury Madison & Sutro, LLP

[57] ABSTRACT

A tool holder composed of: a holder body, the holder body including: a tip mounting portion; a cutting tip held to the holder body at the tip mounting portion; a face adjoining the cutting tip; and a protrusion projecting from the face to thereby rebound chips produced by the cutting tip during a cutting operation.

13 Claims, 7 Drawing Sheets

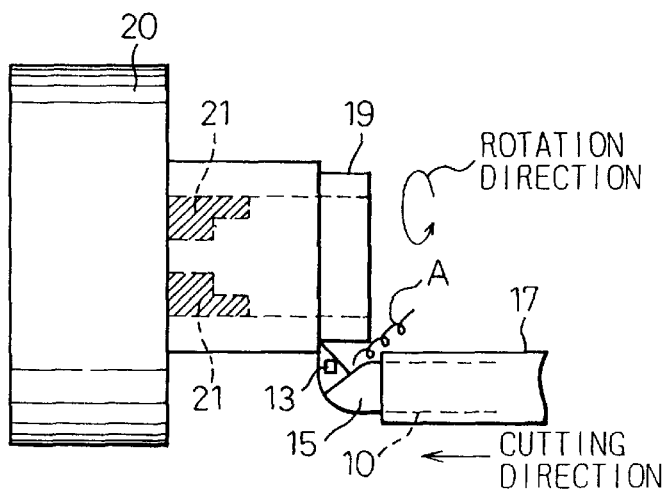
Fig.8A
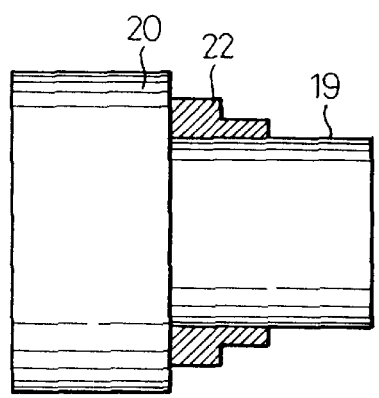
Fig.8B
Fig.9
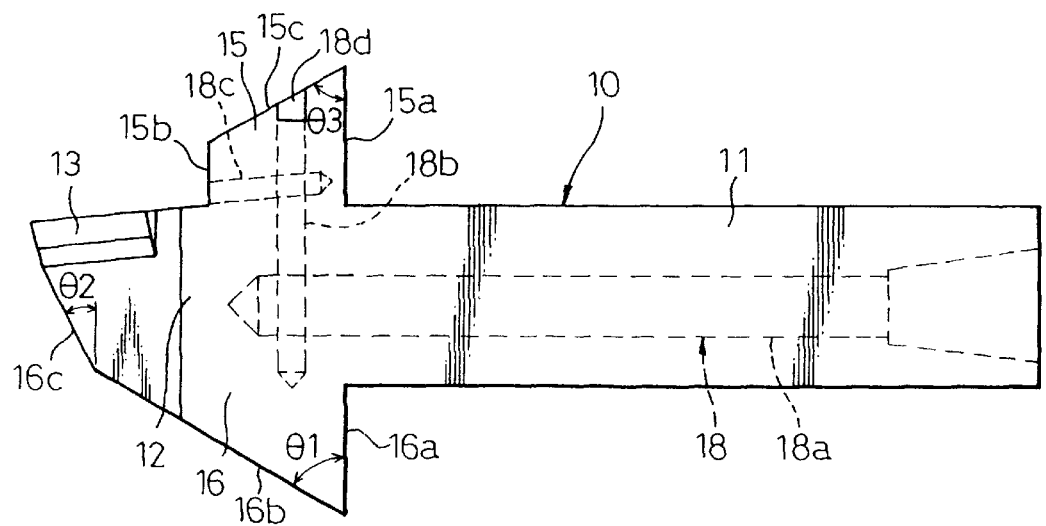

TOOL HOLDER AND CUTTING PROCESS USING THE TOOL HOLDER

BACKGROUND OF THE INVENTION

1. Field of the Invention

The present invention generally relates to a tool holder used with a machine tool such as a lathe, and more particularly relates to a tool holder which prevents chips from winding around the tool holder and to a cutting process using the tool holder.

2. Description of the Related Art

Typically, a conventional tool holder includes a holder body 110 having a tip mounting portion 112, to which a cutting tip 113 is fastened by fastening means such as a screw 114, as shown in FIGS. 10, 11 and 12. The shank portion 111 of the holder body 110 has a substantially rectangular section, and the tip mounting portion 112 has a larger section than the shank portion 111 so that the cutting tip 113 is easily fastened to the tip mounting portion 112. Therefore, the holder body 110 has a shoulder portion 112a between the tip mounting portion 112 and the shank portion 111.

The shank portion 111 of the holder body 110 is inserted into a mounting hole 117a of a machine tool and held by a tool rest block 117 of the machine tool. The holder body 110 projects from the tool rest block 117 and has a sufficiently protruding length L' as shown in FIG. 12, between the front end of the holder body 110 and the front end of the tool rest block 117, to prevent another adjoining tool rest block from contacting and interfering with a workpiece (not shown).

However, since the holder body 110 has the shoulder portion 112a between the tip mounting portion 112 and the shank portion 111, and since the section of the tip mounting portion 112 is larger than the section of the shank portion 111, once chips A wind around the shank portion 111, the shoulder portion 112a prevents the chips A from moving toward the tip mounting portion 112 beyond the shoulder portion 112a, so that the chips A remain around the shank portion 111, as shown in FIG. 13.

The chips A winding around the shank portion 111 may give an adverse affect on the smooth cutting operation of the cutting tip 113, so that the productivity of cutting and the quality of work such as dimensional accuracy and appearance are reduced.

SUMMARY OF THE INVENTION

Therefore, a principal object of the present invention is to provide a tool holder which prevents chips from winding about the tool holder, and a cutting process using the tool holder.

Another object of the present invention is to effectively prevent vibration of the tool holder during the cutting operation.

A further object of the present invention is to easily set the projecting length of the tool holder from the end face of the tool rest block.

In accordance with the present invention, there is provided a tool holder adapted for being mounted on a tool rest block of a machine tool and having a holder body provided with a tip mounting portion thereof, and a cutting tip removably attached to said tip mounting portion of said holder body to cut a workpiece, the holder body including an axially extending portion provided for being supported by the tool rest block and having at least one outer face portion formed therein, said tool holder comprising:

a protrusion projecting from said outer face portion of said axially extending portion of said tool body at a position adjoining said cutting tip to thereby urge chips produced by said cutting tip during cutting of the work to rebound from said protrusion.

Since the protrusion of the tool holder can rebound the chips, the chips are prevented from winding about the tool holder. Therefore, high productivity by means of cutting, and good quality work, referring to dimensions and appearance, are obtained.

Further, there is provided a tool holder adapted for being mounted on a tool rest block of a machine tool and having a holder body provided with a tip mounting portion thereof, and a cutting tip removably attached to said tip mounting portion of said holder body to cut a workpiece, the holder body including an axially extending portion provided for being supported by the tool rest block and having a central axis thereof, a first outer face arranged generally axially rearward of said tip mounting portion, and a second outer face portions arranged to be parallel with the first outer face but opposite to said first outer face with respect to said central axis, said tool holder comprising:

a protrusion projecting from the second outer face of said axially extending portion of said holder body, said protrusion having an inclined surface formed thereon, a vertical distance measured from a given position on said inclined surface to the central axis continuously increasing as the given position is displaced from an axially front end of said protrusion toward an axially opposite rear end of said protrusion.

Therefore, before the chips wind about the holder body, the chips can easily drop toward the tip mounting portion, so that the chips are effectively prevented from remaining around the holder body.

Preferably, while the holder body is fixed to the tool rest block, the protrusion is in tight contact with the end face of the tool rest block, so that the chips are prevented from penetrating between the protrusion and the tool rest block.

Also, since the area of the holder body supported by the tool rest block is increased due to the above mentioned contact, the vibration of the cutting tip at the tip mounting portion of the holder body during the cutting operation is effectively decreased, the deflection of the holder body is effectively decreased, and any deficiency of the cutting tip is extremely decreased.

Preferably, the protrusion which rebounds chips produced by the cutting tip further comprises an inclined surface formed on the protrusion, the vertical distance from the inclined surface to the axial center getting larger as the vertical distance is measured from the tip mounting portion toward the axially opposite end. Therefore, the chips can easily drop along the inclined surface toward the tip mounting portion of the holder body.

Preferably, the holder body further comprises a vertical surface extending perpendicularly to the axis, and the height of the vertical surface is equal to or more than half the height of the holder body, so that the protrusion can more effectively rebound the chips.

Further, the holder body has a coolant supply passage penetrating therethrough for discharging coolant toward the cutting tip, so that the cutting tip can be cooled by the coolant and the chips can be prevented from winding about the holder body.

Preferably, since the protrusion is integrally formed with the holder body by means of cutting, the integrally formed holder body can be easily made at lower cost than the holder body formed separately.

Furthermore, while the tool holder of this invention is used with the lathe in the above embodiments, the tool holder can also be used with another type of machine tool, such as a milling machine including a machining center in another embodiment, in which the tool holder of this invention rotates and holds the cutting tip so as to cut the work.

In a further embodiment, the tool holder of this invention may be used in face milling, in which the tool holder is disposed opposite to the work.

In still further embodiment, the tool holder of this invention may be used as a boring head for forming a bore into a work.

BRIEF DESCRIPTION OF THE DRAWINGS

The above and other objects, features and advantages of the present invention will be made more apparent from the ensuing description of the preferred embodiments thereof in conjunction with the accompanying drawings wherein:

FIGS. 8A and 8B show preferred embodiments of inner and outer claws mounted to the chuck body of the lathe;

FIG. 9 is an elevational view of the holder body of another preferred embodiment of the tool holder according to the present invention;

DESCRIPTION OF THE PREFERRED EMBODIMENTS

Figure 1:
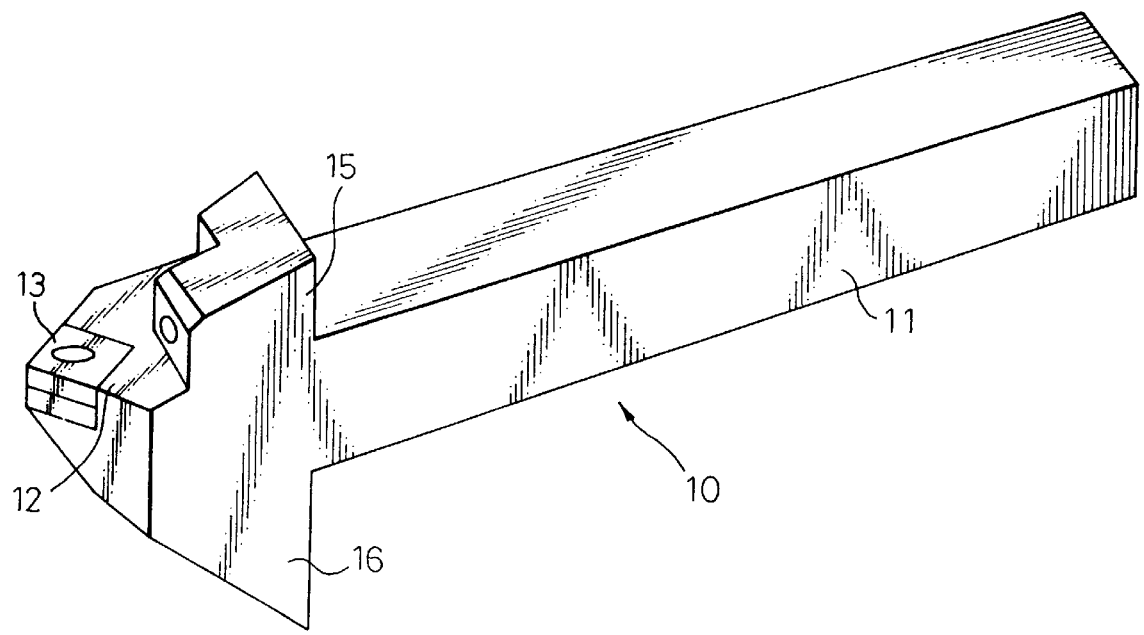
FIG. 1 is a perspective view of a tool holder according to a preferred embodiment of the present invention.
Figure 2:
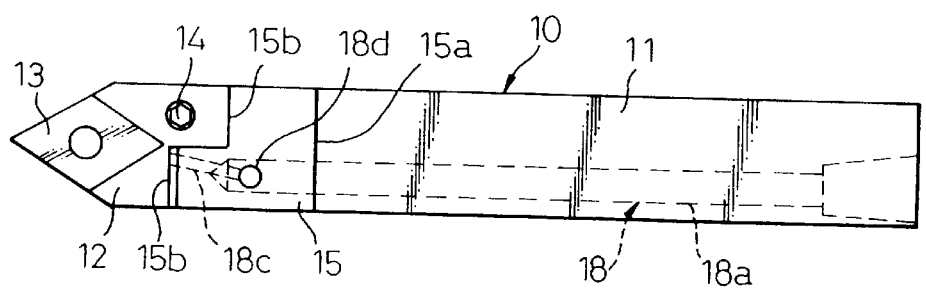
FIG. 2 is an elevational view of the tool holder according to the preferred embodiment of the present invention.
Figure 3:
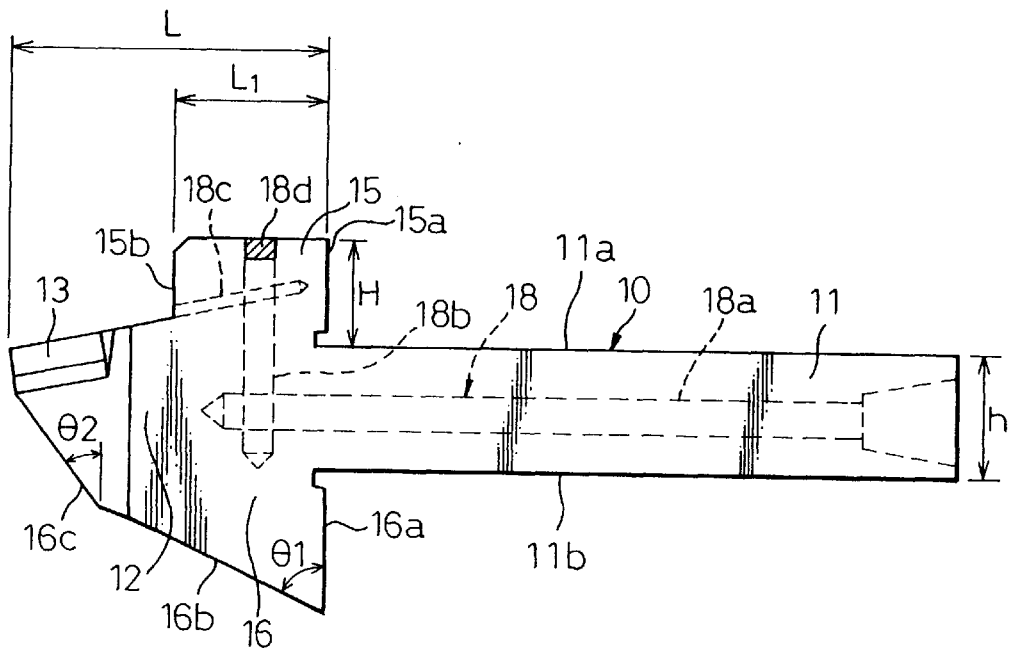
FIG. 3 is a top view of the tool holder according to the preferred embodiment of the present invention.

FIGS. 1, 2 and 3 respectively show a holder body 10 of the first embodiment of the tool holder of the present invention. Referring to FIGS. 1, 2 and 3, the holder body 10 made of metal such as steel alloy includes a shank portion 11 which has a substantially rectangular section. A cutting tip 13 made of metal such as cemented carbide is removably fixed to the tip mounting portion 12 of the holder body 10. Particularly, a screw 14 pushes an eccentric arm member (not shown) of the cutting tip 13 to the right in FIG. 2, so that the cutting tip 13 is fixed to the tip mounting portion 12.

This cutting tip 13 is so-called a throw-away tip. While the cutting tip 13 has rhombic form in this embodiment, as shown in FIG. 2, the cutting tip may have rectangular, triangular or any other form in another preferred embodiment.

Also, the holder body 10 has protrusions 15 and 16 projecting from the upper and bottom surfaces 11a and 11b of the shank portion 11 respectively, the protrusions 15 and 16 being axially disposed between the cutting tip 13 and the shank portion 11. The protrusions 15 and 16 are integrally formed with the shank portion 11 of the holder body 10 by means of cutting.

In this embodiment, the protrusion 15 on the upper surface 11a of the holder body 10 has two vertical surfaces 15a and 15b extending perpendicularly to the axial direction of the shank portion 11, and the protrusion 16 on the bottom surface 11b of the holder body 10 has only a vertical surface 16a extending perpendicularly to the axial direction of the shank portion 11 and adjoining the shank portion 11, as shown in FIG. 3. The vertical surfaces 15a and 16a are formed on a same single plane. The protrusion 16 has a first inclined surface 16b facing downwardly and forwardly, the first inclined surface 16b forming an angle θ1 with the vertical surface 16a at the lower end of the vertical surface 16a, as shown in FIG. 3.

Also, the holder body 10 has a second inclined surface 16c adjoining the forward end of the first inclined surface 16b and forming an angle θ2 with respect to the vertical surface 16a at the forward end of the first inclined surface 16b, as shown in FIG. 3. The angle θ1 is larger than the angle θ2.

Figure 6:
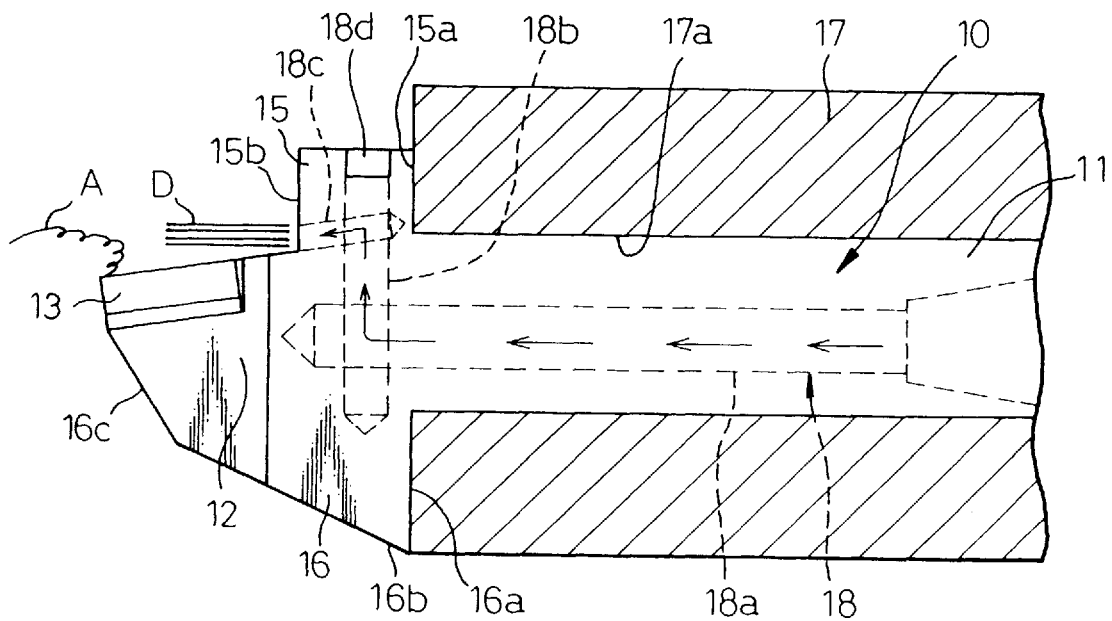
FIG. 6 shows the coolant such as air or water which is discharged from the forward end of the passage tube 18c toward the cutting tip 13 as shown in an arrow D.

The holder body 10 further includes a coolant supply passage 18 penetrating therethrough, the coolant supply passage 18 discharging the coolant toward the cutting tip 13 so as to cool the cutting tip 13, as shown in FIGS. 2, 3 and 6.

The passage 18 includes a first passage tube 18a axially extending from the rear end of the shank portion 11 into the tip mounting portion 12, a second passage tube 18b crossing the first passage tube 18a at the forward end of the first passage tube and vertically extending from the forward end of the first passage tube 18a to the upper end of the protrusion 15, and a third passage tube 18c crossing the second passage tube 18b in the protrusion 15 and terminating at the bottom of the vertical surface 15b. The second passage tube 18b is sealed at its upper end with a plug 18d, as shown in FIGS. 2, 3 and 6. The supply unit of the coolant (not shown) is connected to the rear end of the first passage tube 18a. The coolant is transferred via the first, second and third passage tubes 18a, 18b and 18c, and discharged toward the cutting tip 13 from the forward end of the third passage tube 18c.

Figure 4:
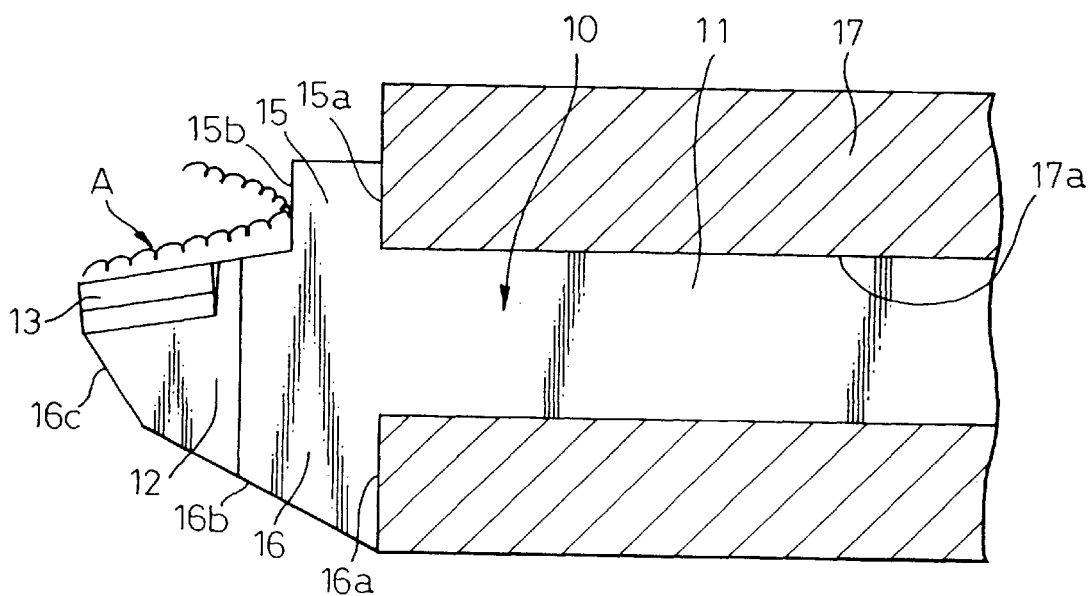
FIG. 4 shows chips which move backwardly along the holder body of the preferred embodiment, and then impinge on the vertical surface and rebound back from the vertical surface.
Figure 5:
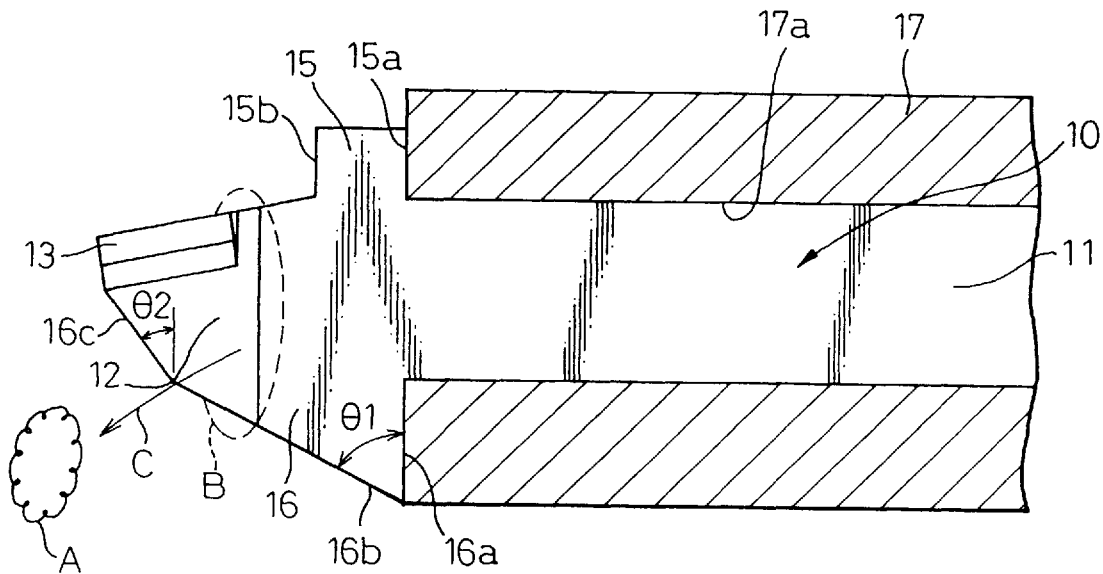
FIG. 5 shows chips which move as shown in an arrow C from the position shown in dashed line B along the first inclined surface of the holder body of the preferred embodiment.

The FIGS. 4, 5 and 6 show the holder body 10 of the first embodiment of the tool holder of the present invention, the holder body 10 being firmly mounted to the tool rest block 17. As mentioned above, the vertical surfaces 15a and 16a of the protrusions 15 and 16 are formed on the same single plane, they can tightly contact the end surface of the tool rest block 17. The shank portion 11 of the holder body 10 is inserted into a mounting hole 17a of the tool rest block 17, and is removably fixed to the tool rest block 17 by means of fastening means such as screws (not shown), while the vertical surfaces 15a and 16a of the protrusions 15 and 16 are in tight contact with the end surface of the tool rest block 17.

Since the vertical surfaces 15a and 16a of the protrusions 15 and 16 can tightly contact the end surface of the tool rest block 17, a protruding length L (see FIG. 3) of the cutting tip 13 from the end surface of the tool rest block 17 can be easily and accurately set by merely causing the vertical surfaces 15a and 16a to come into contact with the end surface of the tool rest block 17. The protruding length L is set for a length such as about 45 mm, in order to prevent the tool rest block 17 from contacting a work which is positioned near the tool rest block 17.

Preferably, an axial length $L_1$ (see FIG. 3) of the protrusion 15 is about half the protruding length L so as to prevent the protrusion 15 from contacting the cutting tip 13, so that the passage tubes 18b and 18c are conveniently formed.

When the cutting tip 13 cuts the work (not shown), chips A produced from the work move backwardly along the holder body 10, and then impinge on the vertical surface 15b and rebound back from the vertical surface 15b, as shown in FIG. 4. Therefore, chips A are effectively prevented from winding around the tool holder.

In accordance with the trial and review by this inventor, the height H of the vertical surface 15a and the height of the vertical surface 15b are preferably equal to or more than half the height h of the shank portion 11, so that chips A can rebound back, as shown in FIG. 3. Even if chips A wind about the holder body 10 behind the cutting tip 13, as shown in dashed line B in FIG. 5, since the bottom protrusion 16 has the first inclined surface 16b which forms the angle θ1 with the vertical surface 16a at the lower end of the vertical surface 16a and extends forwardly from the lower end of the vertical surface 16a, the chips A can easily move forwardly along the first inclined surface 16b and drop from the forward end of the holder body 10, as shown in an arrow C in FIG. 5.

Also, in this preferred embodiment, since the holder body 10 has the second inclined surface 16c which adjoins the first inclined surface 16b at the forward end of the first inclined surface 16b and forms the angle θ2 with respect to the vertical surface 16a at the forward end of the first inclined surface 16b, the angle θ2 being smaller than the angle θ1, as mentioned above, the chips A can further easily drop from the forward end of the holder body 10.

In accordance with the trial and review by this inventor, preferably the angle θ1 of the first inclined surface 16b is equal to or less than 60 degrees, and the angle θ2 of the second inclined surface 16c is equal to or less than 55 degrees, so that the chips A can drop from the forward end of the holder body 10.

When the shank portion of the holder body is inserted into the mounting hole of the tool rest block, while the holder body 110 of prior art is held by the tool rest block 117 in contact with only the inner surface of the mounting hole 117a, the holder body 10 of this preferred embodiment of the tool holder of the present invention is held by the tool rest block 17 in contact with the inner surface of the mounting hole 17a and the vertical surfaces 15a and 16a, so that the holder body 10 of this preferred embodiment is more firmly secured to the tool rest block 17 than the holder body 110 of prior art.

Therefore, the vertical vibration of the tip mounting portion 12 of the holder body 10, that is the vertical vibration of the cutting tip 13 mounted to the holder body 10 is extremely reduced, so that the malfunction such as a deficiency of the cutting tip 13 due to the vertical vibration thereof can be reduced.

Furthermore, since the vertical surfaces 15a and 16a are in tight contact with the end surface of the tool rest block 17, the chips A can be prevented from penetrating between the end surface of the tool rest block 17 and the protrusion 15 or 16.

With reference to FIG. 6, a coolant such as air or water is discharged from the forward end of the passage tube 18c toward the cutting tip 13, as shown in an arrow D, so that the cutting tip 13 and the work (not shown) can be effectively cooled by the coolant. Also, the cutting tip 13 and the work can be lubricated by adding lubricant to the coolant.

Furthermore, since the coolant is discharged toward the cutting tip 13 and the chips A, as shown in the arrow D in FIG. 6, the chips A are prevented from winding about the holder body 10.

Figure 7A:
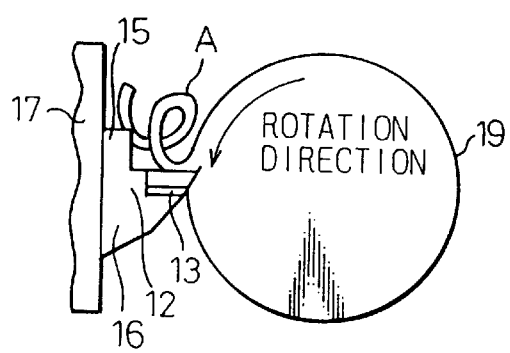
FIGS. 7A to 7D show four different configurations of the respective tool holders of this embodiment relative to the works which rotate forward or backward.
Figure 7B:
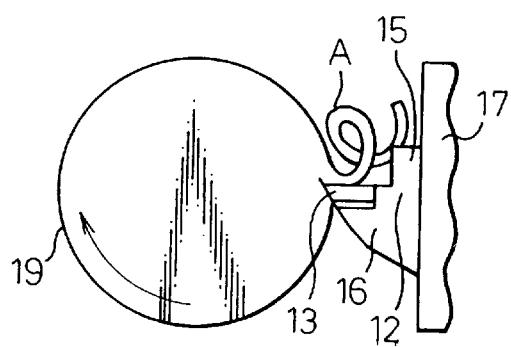
Figure 7C:
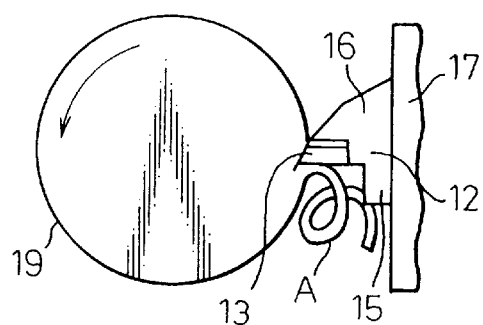
Figure 7D:
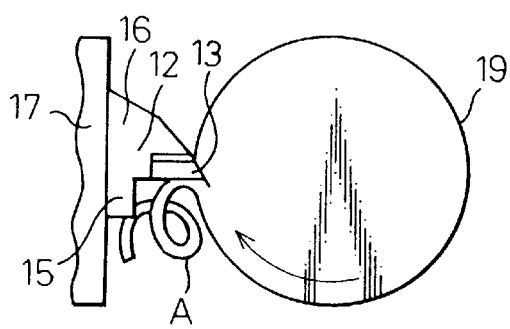
Figure 10:
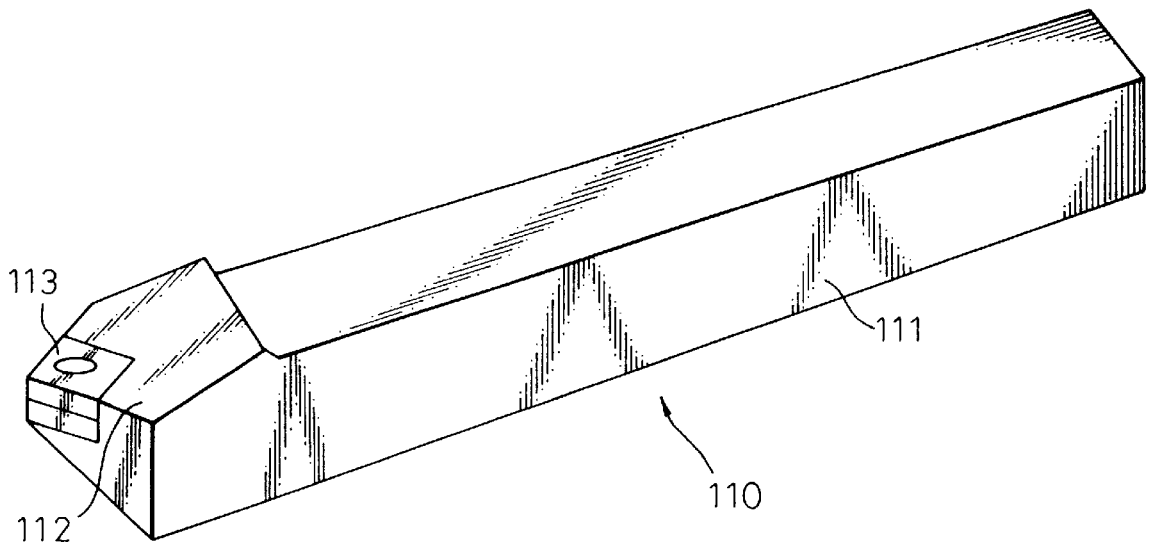
FIG. 10 is a perspective view of the holder body of prior art.
Figure 11:
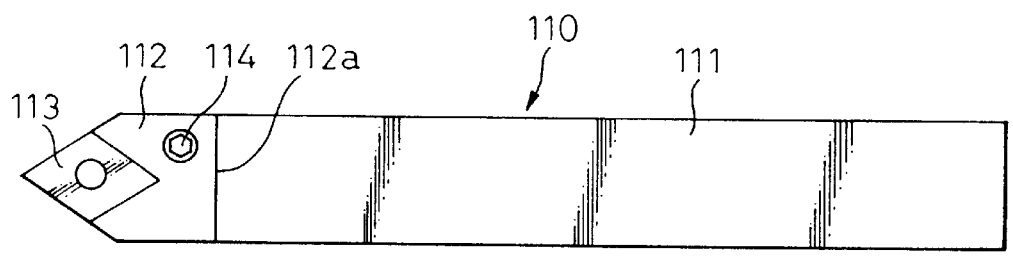
FIG. 11 is a top view of the holder body of prior art.
Figure 12:
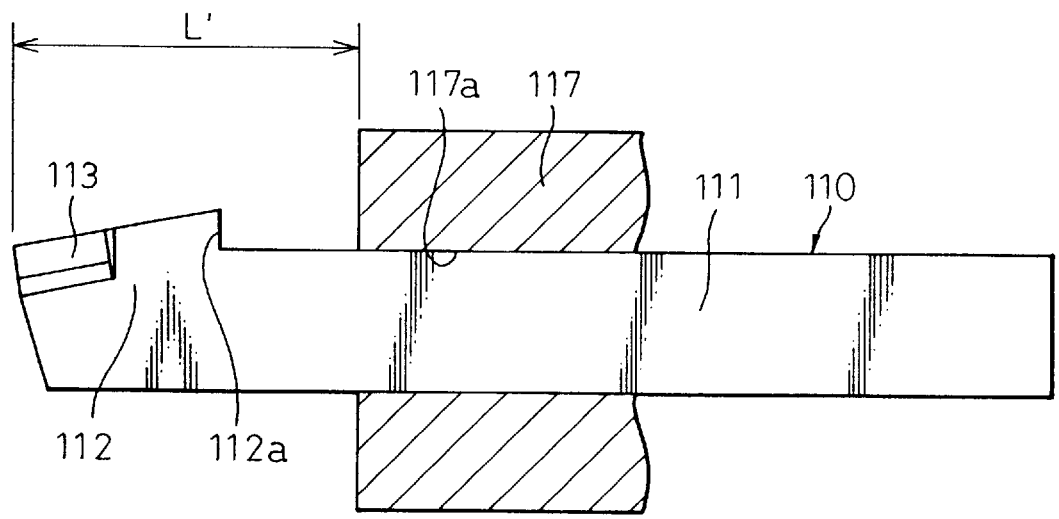
FIG. 12 is an elevational view of the holder body of prior art which is mounted to the tool rest block.
Figure 13:
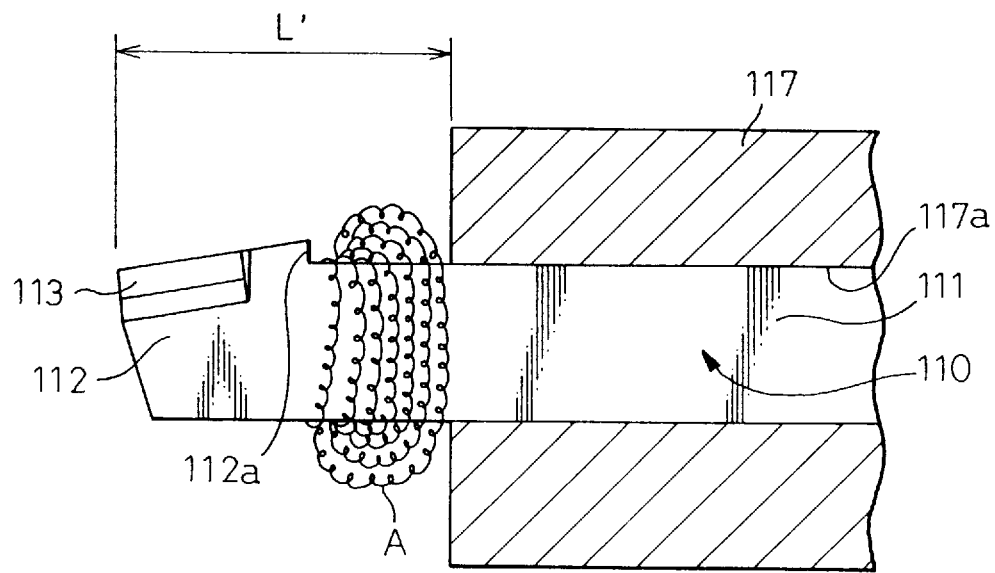
FIG. 13 shows the chips which remain around the shank portion of prior art.

FIGS. 7A to 7D show four different configurations of the respective tool holders of this embodiment relative to the works which rotate forward or backward. With reference to FIG. 7A, the work 19, that is the spindle rotates forwardly, and the cutting tip 13 is positioned at the top of the tip mounting portion 12 of the holder body. With reference to FIG. 7B, the work 19 rotates backwardly, and the cutting tip 13 is positioned at the top of the tip mounting portion 12 of the holder body. With reference to FIG. 7C, the work 19, i.e. the spindle, rotates forwardly, and the cutting tip 13 is positioned at the bottom of the tip mounting portion 12 of the holder body. With reference to FIG. 7D, the work 19 rotates backwardly, and the cutting tip 13 is positioned at the bottom of the tip mounting portion 12 of the holder body.

The chips A are effectively prevented from winding about the holder body in respective configurations as shown in FIGS. 7A to 7D.

FIG. 8A shows a preferred embodiment of inner claws 21 mounted to the chuck body 20 of the lathe, pivotably fixing the pipe form work 19 to the chuck body 20, and pushing the inner surface of the pipe form work 19 outwardly, the outer surface of the pipe form work 19 being cut by the cutting tip 13 held to the holder body 10 of the preferred embodiment of the tool holder of the present invention. That is, in this embodiment, the work is held by the chuck body 20 and the inner claws 21.

The holder body 10 of the tool holder is fixed to the tool rest block 17.

After the holder body 10 is mounted to the tool rest block 17 and the work 19 is fixed to the chuck body 20, while the work 19 rotates in the rotation direction and the holder body 10 of the tool holder moves in the cutting direction, as shown in FIG. 8A, the cutting tip 13 contacts the outer surface of the pipe form work 19, so as to cut the outer surface of the pipe form work 19.

FIG. 8B shows another preferred embodiment of outer claws 22 mounted to the chuck body 20 of the lathe, pivotably fixing the cylindrical work 19 to the chuck body 20, and pushing the outer surface of the cylindrical work 19 inwardly.

FIG. 9 shows the holder body 10 of another preferred embodiment of the tool holder of the present invention. The holder body 10 of this embodiment includes an upper protrusion 15 having an inclined surface 15c at the top of the protrusion 15, the inclined surface 15c facing forwardly and upwardly. The chips A can drop more easily due to the inclined surface 15c. The inclined surface 15c forms an angle θ3 with the vertical surface 15a at the upper end of the vertical surface 15a. The angle θ3 may be substantially equal to the angle θ1 which the inclined surface 16b forms with the vertical surface 16a at the lower end of the vertical surface 16a.

While the holder body 10 in the above mentioned embodiment has upper and bottom protrusions 15 and 16 on the tip mounting portion 12, the holder 10 may have side protrusions 15 and 16 on the tip mounting portion 12 in another preferred embodiment.

Furthermore, while the tool holder of this invention is used with the lathe in the above embodiments, the tool holder can be used with another cutting machine such as a milling machine including a machining center in another embodiment, in which the tool holder of this invention rotates and holds the cutting tip which cuts the work.

In further embodiment, the tool holder of this invention may be used in face milling, in which the tool holder is disposed opposed to the work.

In still further embodiment, the tool holder of this invention may be used as a boring head for boring a hole into the work.

While the above description constitutes the preferred embodiment of the present invention, it will be appreciated that the invention is susceptible to modification, variation and change without departing from the proper scope and fair meaning of the accompanying claims.

What is claimed is:

1. A tool holder adapted for being mounted on a tool rest block of a machine tool and having a holder body provided with a tip mounting portion, and a cutting tip removably attached to said tip mounting portion of said holder body to cut a workpiece, the holder body including an axially extending portion provided for being supported by the tool rest block and having at least one outer face portion formed therein, said tool holder comprising:

a protrusion projecting from said outer face portion of said axially extending portion of said tool body at a position adjoining said cutting tip to thereby urge chips produced by said cutting tip during cutting of the work to rebound from said protrusion, wherein:

said protrusion comprises a portion thereof in tight contact with said tool rest block of the machine tool, whereby said tool holder is mounted on and fixed to the tool rest block of the machine tool;

said outer face portion of said tool body comprises an axially extending flat surface, and said portion of said protrusion comprises a surface portion vertical to said axially extending flat surface of said tool body;

said axially extending portion of said holder body has a central axis;

said protrusion further includes a vertical surface formed at a position contiguous to said tip mounting portion and extending perpendicularly to the central axis of said axially extending portion of said holder body to thereby permit cutting chips to impinge upon said vertical surface of said protrusion during cutting of the workpiece; and said protrusion has a vertical height at a position corresponding to said vertical surface thereof equal to or more than one half of a vertical height of said holder body.

2. A tool holder according to claim 1, wherein said axially extending portion of said holder body comprises a generally axially extending shank portion contiguous to said tip mounting portion and having a longitudinal axis thereof extending centrally through said axially extending portion, said shank portion having a rear end located axially opposite to said tip mounting portion, and wherein said protrusion has an end surface thereof formed to be inclined with respect to said longitudinal axis of said shank portion, whereby a vertical distance measured from a given position on said inclined end surface of said protrusion to said longitudinal axis continuously increases as said given position is axially displaced away from one axial end of said protrusion toward an opposite end of said protrusion.

3. A tool holder according to claim 1, wherein said axially extending portion of said holder body has a first outer face portion from which said protrusion projects and a second outer face portion opposite to said first outer face portion with respect to the axis thereof, and wherein said tool holder further comprises a second protrusion projecting from said second outer face of said axially extending portion to thereby move the cutting chips away from said holder body without being wound around said tip mounting portion.

4. A tool holder according to claim 3, wherein said second protrusion has an end surface formed to be inclined with respect to said axis of said axially extending portion of said holder body, whereby a vertical distance measured from a given position on said inclined surface of said second protrusion to said axis of said holder body continuously increases as said given position is displaced away from an axial end of said second protrusion toward the opposite end of said second protrusion.

5. A tool holder according to claim 3, wherein said second protrusion comprises apportion adapted to be in tight contact with the tool rest block of the machine tool when said tool holder is mounted on the rest block.

6. A tool holder according to claim 2, wherein said shank portion of said holder body has a first outer face portion from which said protrusion projects and a second outer face portion opposite to said first outer face portion with respect to the longitudinal axis of said shank portion, and wherein said tool holder further comprises a second protrusion projecting from said second outer face of said shank portion to thereby move cutting chips away from said holder body without being wound around said tip mounting portion.

7. A tool holder according to claim 6, wherein said second protrusion has an end surface thereof formed to be inclined with respect to said longitudinal axis of said shank portion of said holder body, whereby a vertical distance measured from a given position on said inclined surface of said second protrusion to said longitudinal axial of said shank portion continuously increases as said given position is displaced from an axial end of said second protrusion adjoining said tip mounting portion toward the opposite end of said second protrusion.

8. A tool holder according to claim 6, wherein said second protrusion comprises a portion adapted to be in tight contact with the tool rest block of the machine tool when said tool holder is mounted on the rest block.

9. A tool holder according to claim 8, wherein said portion of said second protrusion includes a surface portion formed to be perpendicular to the longitudinal axis of said shank portion to thereby allow said surface portion to come into tight contact with the tool rest block when the holder body is mounted on the tool rest block.

10. A tool holder according to claim 2, wherein said protrusion further includes a vertical surface formed at a position contiguous to said tip mounting portion and extending perpendicularly to the longitudinal axis of said shank portion of said holder body to thereby permit said cutting chips to impinge upon said vertical surface of said protrusion during cutting of the workpiece.

11. A tool holder according to claim 1, wherein said holder body has a coolant supply passage penetrating through said axially extending portion of said holder body for discharging coolant toward said cutting tip to thereby cool said cutting tip.

12. A tool holder according to claim 1, wherein said protrusion is machined and formed to be integral with said holder body.

13. A process using the tool holder according to claim 1 for cutting a workpiece in a cutting machine, the cutting machine including a tool rest block and a holding member, comprising the steps of:

mounting the tool holder on the tool rest block of the cutting machine;

placing the workpiece on the holding member of the cutting machine, adjacent to the cutting tip;

rotating at least one of the holder body and the workpiece;

contacting the cutting tip with the workpiece to thereby cut the workpiece; and rebounding the chips produced by means of the cutting tip.

\* \* \* \* \*